(No Model.)
C. G. TEUBNER.
SCREW DRIVER.
No. 415,481. Patented Nov. 19, 1889.
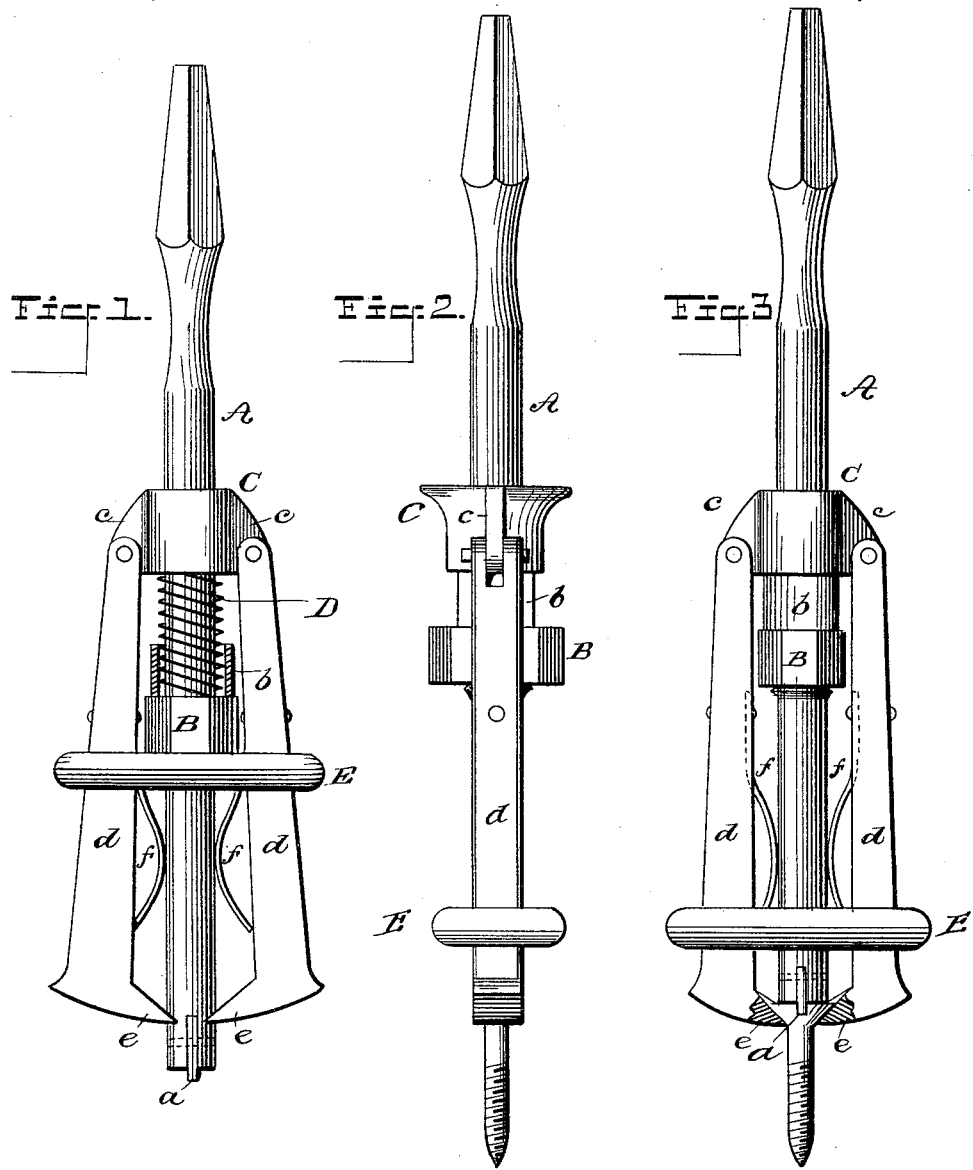
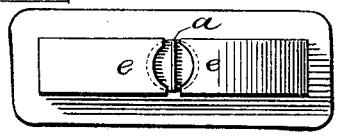
WITNESSES:
INVENTOR
C. G. Teubner
BY Munn & Co.
ATTORNEY

UNITED STATES PATENT OFFICE.

CHARLES GEORGE TEUBNER, OF LEXINGTON, MISSOURI.

SCREW-DRIVER.

SPECIFICATION forming part of Letters Patent No. 415,481, dated November 19, 1889.

Application filed June 9, 1888. Serial No. 276,567. (No model.)

*To all whom it may concern:*

Be it known that I, CHARLES GEORGE TEUBNER, of Lexington, in the county of Lafayette and State of Missouri, have invented a new and Improved Screw-Driver, of which the following is a specification, reference being had to the annexed drawings, forming a part thereof, in which—

Figure 1 is a side elevation of my improved screw-driver. Fig. 2 is an edge view. Fig. 3 is a side elevation, partly in section, showing its application to the head of a screw; and Fig. 4 is an inverted plan view.

Similar letters of reference indicate corresponding parts in all the views.

The object of my invention is to construct a screw-driver which will clamp the head of a screw and hold it in a fixed position while it is being driven in.

The invention consists in the particular construction and arrangement of parts, as hereinafter fully described, and pointed out in the claim.

The rod A, forming the body of the screw-driver, is adapted to fit a brace or to be received in a screw-driver handle. The end of the rod A which engages the head of the screw is squared and provided with a central slot, in which is inserted a nib $a$, which fits into the nick of the screw, the said nib being secured in place by a pin or screw, as shown. On the screw-threaded part of the rod A is placed a hub B, provided with a sleeve $b$, which serves as a housing for the spring D, hereinafter referred to, and between the hub B and the handle end of the rod A is placed a sliding sleeve C, provided with ears $c$. By means of this arrangement the screw-driver is adapted to fit screws of different sizes.

To the ears $c$ are pivoted tapering jaws $d$, provided with inwardly-extending chisel-shaped ends $e$ for engaging the beveled head of the screw, the inner edges of the ends $e$ being concaved to adapt them to the circular form of the screw-head. To the inner surfaces of the jaws $d$ are attached the curved springs $f$, which bear against the rod A and tend to force the jaws $d$ outward.

Between the hub B and the sleeve C is placed a spiral spring D, which tends to press the sleeve C toward the handle end of the rod A. An oblong ring E surrounds the jaws $d$ and serves to draw the said jaws together when it is pushed downward.

The screw is placed upon the end of the rod A with the nib $a$ projecting into the nick of the screw, when the sleeve C is pushed downward to bring the ends $e$ of the jaws $d$ into engagement with the head of the screw, and the ring E is slipped down upon the jaws $d$ to clamp the screw tightly in its place upon the end of the rod A, when the screw may be readily turned until the jaws $d$ approach the surface into which the screw enters. The jaws are then released by moving up the ring E, and the screw is turned until its head is flush with the surface of the material into which it is inserted. When the nib is accidentally broken or wears out, it can readily be replaced by a new one.

Having thus described my invention, I claim as new and desire to secure by Letters Patent—

The herein-described screw-driver, consisting of the rod A, having a screw-threaded portion and provided with the nib $a$, the hub B on the screw-threaded portion of the rod A and having the sleeve $b$, the sleeve C, fitted loosely on the rod A, the spring D, surrounding the rod between the sleeve C and hub B, the jaws $d$, pivoted to the sleeve C and having tapering chisel-shaped ends $e$, the springs $f$, secured to the inner surfaces of the jaws $d$, and the ring E, surrounding the said jaws $d$, as specified.

CHARLES GEORGE TEUBNER.

Witnesses:
J. R. MORELAND,
W. J. BANDON.